(12) United States Patent
Matula

(10) Patent No.: US 7,689,426 B2
(45) Date of Patent: Mar. 30, 2010

(54) METHOD AND APPARATUS FOR DISTRIBUTED INTERACTIVE VOICE PROCESSING

(75) Inventor: Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 39 days.

(21) Appl. No.: 11/845,278

(22) Filed: Aug. 27, 2007

(65) Prior Publication Data

US 2007/0291924 A1    Dec. 20, 2007

Related U.S. Application Data

(63) Continuation of application No. 10/140,850, filed on May 7, 2002, now abandoned.

(51) Int. Cl.
*G10L 15/22* (2006.01)
*H04M 3/50* (2006.01)
*H04M 3/523* (2006.01)

(52) U.S. Cl. ............... 704/270.1; 704/275; 379/265.03; 379/265.11; 379/266.01

(58) Field of Classification Search ................ 704/270, 704/270.1, 275; 379/88.01, 88.16, 265.02, 379/265.06, 265.1, 266.01, 266.08, 265.03, 379/265.11

See application file for complete search history.

(56) References Cited

U.S. PATENT DOCUMENTS

| | | | | |
|---|---|---|---|---|
| 5,036,535 | A | * | 7/1991 | Gechter et al. ......... 379/265.11 |
| 5,179,589 | A | * | 1/1993 | Syu ........................ 379/266.07 |
| 5,291,492 | A | * | 3/1994 | Andrews et al. ............ 370/259 |

(Continued)

FOREIGN PATENT DOCUMENTS

WO    WO 01/35617    5/2001

OTHER PUBLICATIONS

Avaya Communications, DEFINITY® Enterprise Communications Server, Release 9.5, Guide to ACD Call Centers, 3-8 to 325 and 3-26 to 3-40 (Jul. 2001).

(Continued)

*Primary Examiner*—Martin Lerner
(74) *Attorney, Agent, or Firm*—Joseph B. Ryan; Jason Paul DeMont; Wayne S. Breyer

(57) ABSTRACT

A distributed interactive voice processing system is disclosed that distributes IVR capabilities to one or more agent terminals associated with a call center. One or more agent terminals support the traditional functions of a live agent, as well as additional IVR capabilities to support the functions of a virtual or automated agent A call management system manages the distributed IVR resources by monitoring the availability status of the live and automated IVR agents in the distributed interactive voice processing system and distributing telephone calls and other types of communications to the appropriate agents. The availability status of the automated IVR agents is based on estimated available CPU cycles on the agent terminal A received call is routed to the extension on the agent terminal associated with the selected IVR channel. A VXML process associated with the selected IVR channel obtains the appropriate application software from a central voiceXML application server and executes the VXML page (s) to play the appropriate prompts from the IVR script to the caller and to collect DTMF or speech recognized inputs from the caller The distributed design allows centralized application management while using distributed resources to provide improved IVR availability.

12 Claims, 4 Drawing Sheets

U.S. PATENT DOCUMENTS

| | | | | |
|---|---|---|---|---|
| 5,327,491 | A * | 7/1994 | Syu | 379/266.07 |
| 5,796,633 | A * | 8/1998 | Burgess et al. | 702/187 |
| 5,867,562 | A * | 2/1999 | Scherer | 379/88.21 |
| 5,926,528 | A * | 7/1999 | David | 379/112.01 |
| 6,002,760 | A * | 12/1999 | Gisby | 379/266.01 |
| 6,005,932 | A * | 12/1999 | Bloom | 379/265.14 |
| 6,137,870 | A * | 10/2000 | Scherer | 379/127.06 |
| 6,195,357 | B1 * | 2/2001 | Polcyn | 370/401 |
| 6,442,247 | B1 * | 8/2002 | Garcia | 379/88.18 |
| 6,445,788 | B1 * | 9/2002 | Torba | 379/266.08 |
| 6,449,260 | B1 | 9/2002 | Sassin et al. | |
| 6,480,599 | B1 * | 11/2002 | Ainslie et al. | 379/265.02 |
| 6,658,106 | B1 * | 12/2003 | Atkinson et al. | 379/265.11 |
| 6,674,852 | B1 * | 1/2004 | Hamilton | 379/221.14 |
| 6,744,877 | B1 * | 6/2004 | Edwards | 379/265.02 |
| 6,801,604 | B2 * | 10/2004 | Maes et al. | 379/88.17 |
| 6,801,613 | B1 * | 10/2004 | Hamilton | 379/207.02 |
| 6,810,111 | B1 * | 10/2004 | Hunter et al. | 379/1.02 |
| 2003/0212558 | A1 * | 11/2003 | Matula | 704/260 |
| 2003/0215066 | A1 * | 11/2003 | Shambaugh et al. | 379/88.13 |
| 2004/0003042 | A1 * | 1/2004 | Horvitz et al. | 709/204 |
| 2009/0022284 | A1 * | 1/2009 | Matula | 379/88.04 |
| 2009/0185673 | A1 * | 7/2009 | Erhart et al. | 379/265.09 |

OTHER PUBLICATIONS

Scott McGlashan et al., "Voice Extensible Markup Language (VoiceXML) Version 2.0," 1-16 W3C Working Draft, Downloaded from http://www.w3.org/TR/201/WD-voicexml20-20011023/ (Oct. 2001).

Avaya Communications, Avaya CONVERSANT® System, Version 8.0, System Description, Chapter 1, 1-10, (Dec. 2001).

Yoho, "CPU Utilization," download from www.computing.net, (Oct. 4, 2002).

Avaya Communications, Avaya IP Softphone, 1-10 (2002).

Avaya Communications, Avaya# IP Agent (2002).

Quest Software, "Foglight®: The Application Monitoring Solution," (2002).

Anisimove et al., "An Approach to Design Distributed CTI Applications Using Petri Nets: an Example of a Call Center," Systems, Man, and Cybernetics, IEEE International Conference, 238-243 (Oct. 1998).

Baggia et al., "Field Trials of the Italian Arise Train Timetable System," Speech Communication, Elsevier Science Publishers, Amsterdam, NL, vol. 31, No. 4, 355-367 (Aug. 2000).

Kamm et al., "The Role of Speech Processing in Human-Computer Intelligent Communication," Speech Communication, Elsevier Science Publishers, Amsterdam, NL, vol. 23, No. 4, 263-278 (Dec. 1997).

* cited by examiner

FIG. 2

AGENT DATABASE – 200

| AGENT IDENTIFIER 230 | AGENT ADDRESS 235 | AGENT SKILLS 240 | AVAILABILITY 250 |
|---|---|---|---|
| JOHN SMITH | AGENT TERMINAL 1, EXTENSION 1 | FLUENT IN ENGLISH AND SPANISH; CUSTOMER DISPUTE RESOLUTION | ON BREAK |
| IVR AGENT 234 | AGENT TERMINAL 1, EXTENSION 2 | IVR CAPABILITIES | AVAILABLE |
| ... | ... | ... | ... |
| IVR AGENT 456 | AGENT TERMINAL 2, EXTENSION 5 | IVR CAPABILITIES | BUSY |

205 — 210 — 215 — 220

METHOD AND APPARATUS FOR DISTRIBUTED INTERACTIVE VOICE PROCESSING

CROSS-REFERENCE TO RELATED APPLICATION

The application is a continuation of U.S. patent application Ser. No. 10/140,850, filed May 7, 2002 now abandoned and incorporated by reference herein.

FIELD OF THE INVENTION

The present invention relates generally to call centers or other call processing systems in which various types of communications, including voice messages, electronic mail messages, facsimiles, text messages, and Internet service requests, are distributed among a number of service agents for handling.

BACKGROUND OF THE INVENTION

Call centers distribute telephone calls and other types of communications to available customer service representatives, referred to herein as "agents," using well-known automatic call distribution techniques. In a call surplus condition, where there are more incoming calls than agents available to process the incoming calls, the call center maintains one or more call queues to maintain the received incoming calls in an active state until an agent with the necessary skill becomes available to process the incoming call Call centers often employ interactive voice response (IVR) systems to efficiently provide callers with information in the form of recorded messages and to obtain information from callers using keypad or voice responses to recorded queries. The IVR systems are often referred to as "automated agents" or "virtual agents." Existing call centers, such as the CONVERSANT® System for Interactive Voice Response, commercially available from Avaya Inc., are typically implemented as centralized server-based interactive customer service solutions. A number of IVR systems employ the Voice eXtensible Markup Language (VoiceXML) to create IVR scripts. Typically, a media server receives a call, obtains the appropriate VoiceXML page from a dedicated local or remote server and then executes the VoiceXML page for the caller The centralization of such IVR resources makes the administration and maintenance of these resources more efficient and also potentially more reliable due to centralized fault monitoring. Furthermore, the redundancy provided by most IVR systems helps to ensure the continued availability of the customer service capabilities that are critical to the efficient operation of a call center and improves the ability to recover from a failure by allowing IVR tasks to continue on an alternate device upon a detected failure A centralized implementation also allows efficient maintenance of the IVR application processes, including the proprietary call flows and scripting languages, which may require modification or upgrade. IVR systems must typically interface with various subsystems required by the call center, including digital and analog voice circuits, dual tone multiple frequency (DTMF) processing systems, speech recognition systems and text-to-speech processing systems Thus, the specialized circuitry required by the IVR systems to interface with other systems provides additional motivation for such centralized designs.

The agents in a call center typically employ computer terminals that are interconnected using a local area network (LAN). When a call is assigned to an available agent, information about the caller or the call (or both), is often routed with the call to the agent's terminal, for presentation to the agent. In this manner; the agent is better prepared to process the call in an efficient manner with up-to-date call-specific information. It has been found that the processing resources distributed among the various agents in a call center are generally under utilized as agents perform call processing functions A need therefore exists for a method and apparatus for distributing IVR functions among the agent terminals in a call center. A further need exists for a method and apparatus for creating an IVR system using spare processor cycles from agent terminals to supplement or replace centralized or dedicated IVR servers.

SUMMARY OF THE INVENTION

Generally, a distributed interactive voice processing system is disclosed that distributes IVR capabilities to one or more agent terminals associated with a call center An agent terminal in accordance with the present invention is a computer system, such as a personal computer, work station or personal digital assistant, that supports the traditional functions of a live agent, as well as additional IVR capabilities to support the functions of a virtual or automated agent. The distributed interactive voice processing system includes a call management system that manages the distributed IVR resources in accordance with the present invention Generally, the call management system monitors the availability status of the live and automated IVR agents in the distributed interactive voice processing system and distributes telephone calls and other types of communications to the appropriate agents The availability status of the automated IVR agents is based on estimated available CPU cycles on the agent terminal When a call is received by the distributed interactive voice processing system, the call is routed using well-known techniques to the extension on the agent terminal of the selected IVR channel and the remote IVR process handles the call The agent terminals include a VXML process (or another process that provides HTML-based support for IVR) and, optionally, a set of automatic speech recognition (ASR) and text-to-speech (TTS) resources that support the IVR capabilities of the automated IVR agent When a call is assigned to a distributed IVR extension of a given agent terminal, the associated VXML process obtains the appropriate application page and IVR script from a central voiceXML application server. The VXML process executes the VXML page to play the appropriate prompts from the IVR script to the caller and to collect DTMF or speech recognized inputs from the caller At the end of a given call, the VXML process will either disconnect the call or request the IP PBX switch to transfer the call to the appropriate call center agent or application In this manner, the present invention efficiently utilizes otherwise "idle" resources of an agent's terminal to provide IVR channels for everyday use or for peak use when centralized server systems are fully loaded or overloaded. The distributed design allows centralized application management while using distributed resources that provide improved IVR availability.

A more complete understanding of the present invention, as well as further features and advantages of the present invention, will be obtained by reference to the following detailed description and drawings

BRIEF DESCRIPTION OF THE DRAWINGS

FIG. 2 is a sample record from an agent database incorporating features of the present invention;

DETAILED DESCRIPTION

Figure 1:
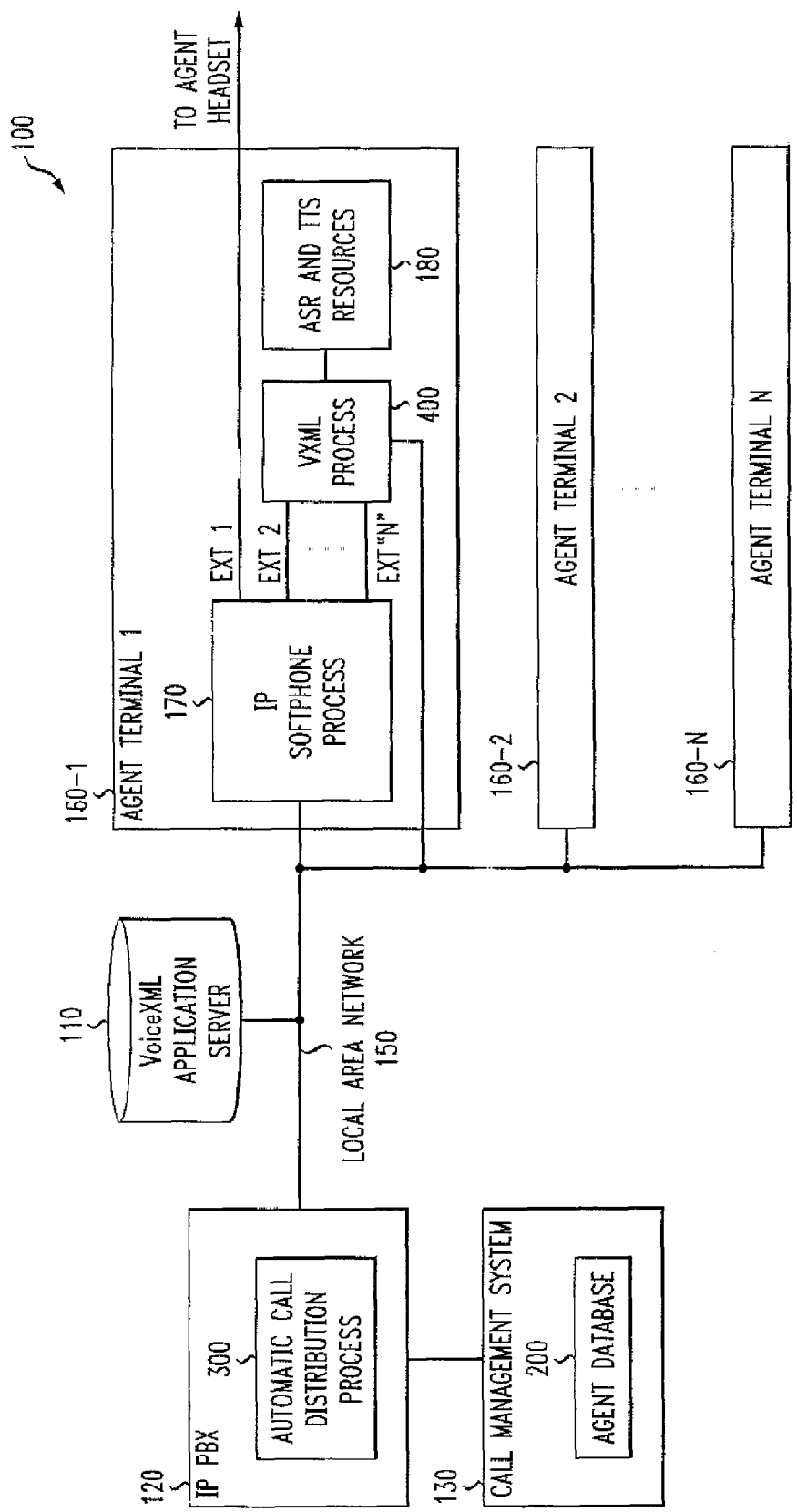
FIG. 1 illustrates distributed interactive voice processing system accordance with the present invention.

FIG. 1 illustrates a distributed interactive voice processing system 100 in accordance with the present invention. As shown in FIG. 1, the distributed interactive voice processing system 100 includes a voiceXML application server 110, an Internet Protocol (IP) private branch exchange (PBX) 120, a call management system 130 and one or more agent terminals 160-1 through 160-N (hereinafter, collectively referred to as agent terminals 160), interconnected by a local area network (LAN) 150. According to one aspect of the present invention, each agent terminal 160 includes capabilities to support the traditional functions of a "live agent," such as an IP Softphone process 170, as well as additional IVR capabilities to support the functions of an "automated agent." An IP Softphone emulates a traditional telephone in a known manner It is noted that the IVR functions that are deployed on the agent terminal 160 of a given live agent may not be related to the work of the given live agent. It is further noted that while the exemplary embodiment employs voiceXML (VXML), other techniques that provide HTML-based support for IVR, such as Speech Application Language Tags (SALT), described, for example, in Speech Application Language Tags (SALT), Technical White Paper, downloadable from www.saltforum.org, could be employed, as would be apparent to a person of ordinary skill in the art, based on the disclosure herein. SALT is a speech interface markup language that extends existing markup languages to enable multi-modal and telephony access to the Internet The IVR application (including the IVR scripts) may be written, for example, in VoiceXML and stored on the central VoiceXML application server 110 The centralized VoiceXML application server 110 simplifies version control and distribution of the application software to the distributed agent terminals 160 without significant administrative overhead. As discussed further below in conjunction with FIG. 4, the VoiceXML application server 110 is presented with requests VXML pages in the exemplary embodiment from a VXML process 400 that supports the IVR capabilities of the automated IVR agent. The VoiceXML application server 110 creates a session with the VXML process 400, and returns the first page of the IVR application encoded in VXML script to the VXML process 400 on the agent terminal 160 for interpretation. For each subsequent request, the VoiceXML application server 110 will obtain or dynamically create (or both) subsequent documents to be sent to the requesting VXML process 400 for rendering. When the interaction with the caller is finished, the final VXML page sent from the VoiceXML application server 110 to the VXML process 400 will instruct the VXML process 400 to terminate or transfer the call to the appropriate call center agent or application The VoiceXML application server 110 may be embodied, for example, as a Microsoft Web server with Internet Information Services (IIS) package installed and enabled, commercially available from Microsoft Corp. of Redmond, Wash., as modified herein to carry out the features and functions of the present invention The IP PBX 120 includes an automatic call distribution process 300, discussed below in conjunction with FIG. 3, that manages the distributed IVR resources in accordance with the present invention Generally, the automatic call distribution process 300 monitors the availability status of all live and automated IVR agents in the distributed interactive voice processing system 100 using an agent database 200, discussed below in conjunction with FIG. 2, and distributes telephone calls and other types of communications to the appropriate agents. The IP PBX 120 can provide information to the call management system 130 regarding the availability of individual agents and other call center statistics, for the generation of appropriate reports and forecasts.

The call management system 130 may be embodied, for example, as the Call Management System®, commercially available from Avaya Inc. of Basking Ridge, N.J., as modified herein to carry out the features and functions of the present invention. The IP PBX 120 may be embodied, for example, as the IP 600 Internet Protocol Communications Server, commercially available from Avaya Inc. of Basking Ridge, N.J., as modified herein to carry out the features and functions of the present invention The IVR capabilities of a given agent terminal 160 appear to the automatic call distribution process 300 as an agent logged onto an instance of a desktop telephone at the corresponding agent terminal 160 When a call is received at the distributed interactive voice processing system 100, the call is routed using well-known techniques to the IVR extension on the agent terminal 160 and the remote IVR process handles the call. The agent terminals 160 can be embodied as any computing system having a processor and memory configured to perform the disclosed features and functions of the present invention, such as a personal computer, workstation or personal digital assistant.

As shown in FIG. 1, and discussed further below, the agent terminal 160 includes a VXML process 400, discussed below in conjunction with FIG. 4, and a set of automatic speech recognition (ASR) and text-to-speech (TTS) resources 180 that support the IVR capabilities of the automated IVR agent. Generally, when a call is assigned to a distributed IVR extension of a given agent terminal 160, the associated VXML process 400 obtains the appropriate application page from the voiceXML application server 110 and begins to execute the VXML page to play the appropriate prompts from the IVR script to the caller and to collect DTMF or speech recognized inputs from the caller At the end of a given call, the VXML process 400 will either disconnect the call or request the IP PBX switch 120 to transfer the call to the appropriate call center agent or application

Call Management System 130

As previously indicated, the automatic call distribution process 300 employs an agent database 200, shown in FIG. 2, to record the availability status of all live and automated IVR agents in the distributed interactive voice processing system 100. The exemplary agent database 200 maintains a plurality of records, such as records 205 through 220, each associated with a different live or automated agent. For each agent identified by an agent identifier in field 230, the agent database 200 includes the extension address of the agent in field 235, an indication of any special skills of the agent in field 240 and an indication of the availability of the agent in field 250 It is noted that the information recorded in fields 230, 235 and 240 would typically be acquired and maintained by the call management system 130, and the information recorded in field 250 would typically be acquired and maintained by the automatic call distribution process 300 (which may in turn provide the availability status to the call management system 130, as indicated above).

Figure 3:
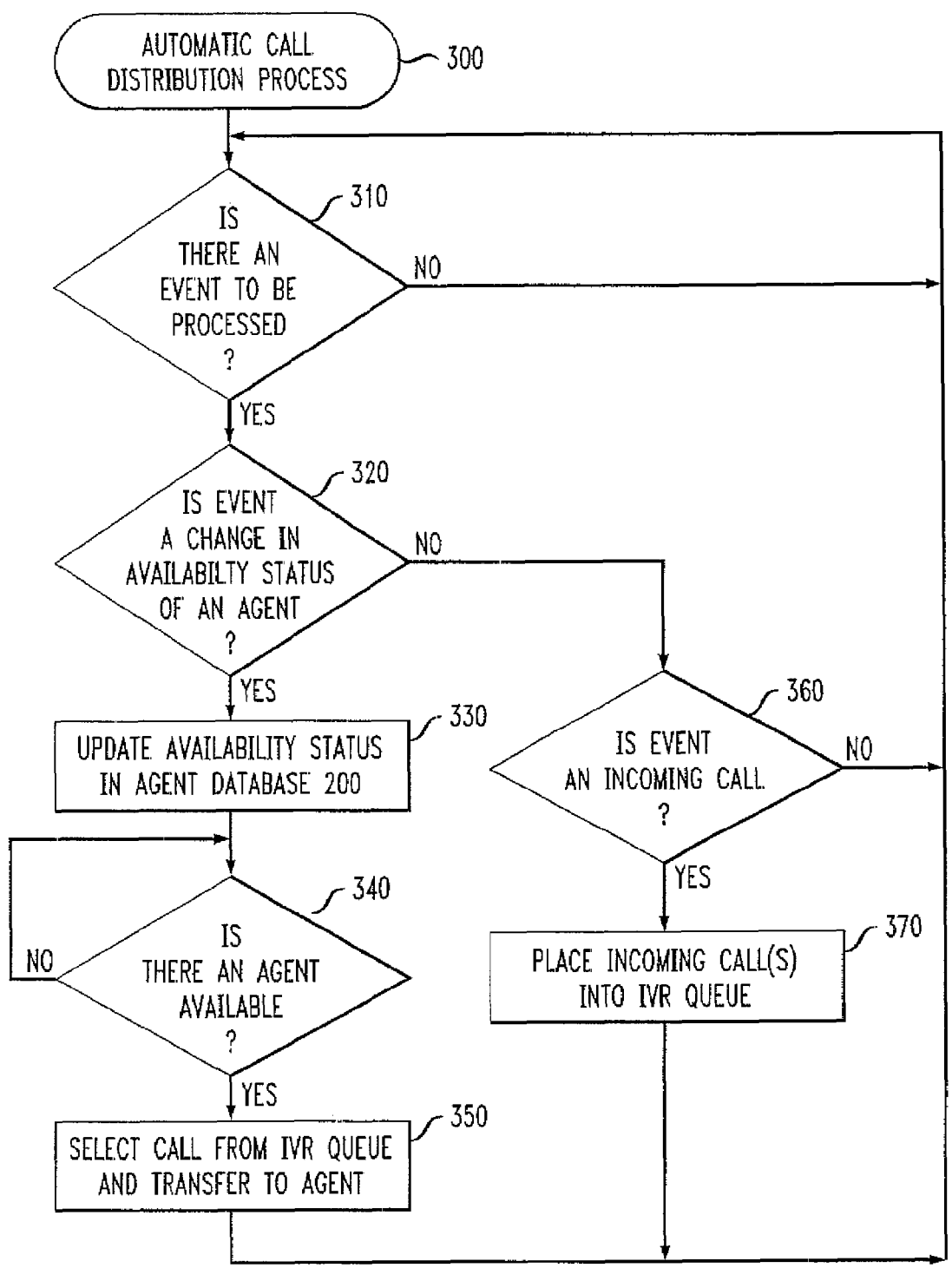
FIG. 3 is a flow chart describing an exemplary implementation of a distributed IVR management process incorporating features of the present invention.

The automatic call distribution process 300, shown in FIG. 3, manages the distributed IVR resources by monitoring the availability status of all live and automated IVR agents in the distributed interactive voice processing system 100 and distributing telephone calls and other types of communications to the appropriate agents. The automatic call distribution process 300 places calls into an IVR queue as with conventional centralized server systems. As discussed hereinafter, whenever an automated IVR agent (or live agent) that is logged into the queue becomes available, a call is selected from the waiting queue and presented to the agent A record of each call started and each call completed is made to the call management system 130 for inclusion in status and historical reports As shown in FIG. 3, the automatic call distribution process 300 initially performs a test during step 310 to determine if an event is detected If it is determined during step 310 that an event is not detected, then program control returns to step 310 until an event to be processed is detected. Once it is determined during step 310 that an event is detected, then program control proceeds to step 320 where a further test is performed during step 320 to determine if event is a change in the availability status of an agent If it is determined during step 320 that there is no change in the availability status of an agent, then program control proceeds to step 360, discussed below. If, however, it is determined during step 320 that there is a change in the availability status of an agent, then the availability status is updated in the agent database 200 during step 330.

A further test is performed during step 340 to determine if an agent is available. If it is determined during step 340 that an agent is not available, then program control returns to step 340 until an available agent is detected. If, however, it is determined during step 340 that an agent is available, then a call is selected from the IVR queue and transferred to the available agent during step 350.

If it is determined during step 320 that there is no change in the availability status of an agent, then a further test is performed during step 360 to determine if the event is an incoming call If it is determined during step 360 that the event is not an incoming call, then program control returns to step 310 and continues in the manner described above. If it is determined during step 360 that the event is an incoming call, then all incoming calls are placed into an IVR queue (not shown) during step 370, in a known manner Program control then terminates or returns to step 310 for continued monitoring of changes in the availability status of agents and distributing telephone calls and other types of communications to the appropriate agents.

Agent Terminal 160

Figure 4:
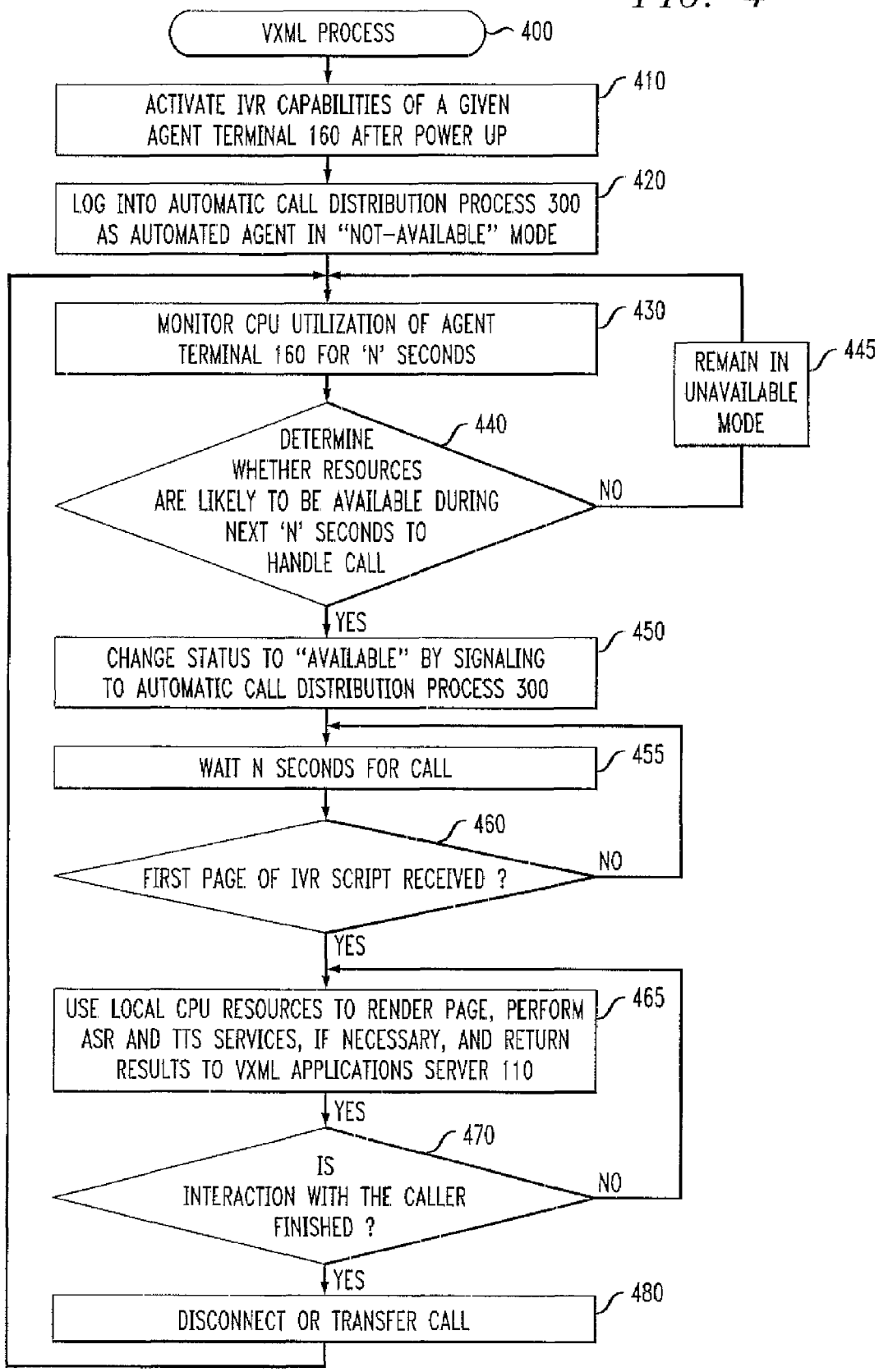
FIG. 4 is a flow chart describing an exemplary implementation of a VXML process incorporating features of the present invention

As previously indicated, the agent terminals 160 employ a VXML process 400, shown in FIG. 4, that supports the IVR capabilities of the automated IVR agent(s). Generally, when a call is assigned to a distributed IVR extension of a given agent terminal 160, the associated VXML process 400 obtains the appropriate application page from the voiceXML application server 110 and begins to execute the VXML, page to play the appropriate prompts from the IVR script to the caller and to collect DTMF or speech recognized inputs from the caller At the end of a given call, the VXML process 400 will either disconnect the call or request the IP PBX switch 120 to transfer the call to the appropriate call center agent or application.

As shown in FIG. 4, the IVR capabilities of a given agent terminal 160 can be activated during step 410, for example, when the live agent turns on the agent terminal 160 Thus, the VXML process 400 is initiated when the agent turns on the agent terminal 160, together with the IP Softphone process 170, and optional ASR and TTS processes The VXML process 400 initially logs into the automatic call distribution process 300 during step 420 as an automated IVR agent in a "not-available" mode The VXML process 400 monitors the CPU utilization of the agent terminal during step 430 for 'N' seconds At the end of the 'N' second cycle, the VXML process 400 determines during step 440 whether resources are likely to be available during the next 'N' seconds to handle a call For example, a minimum number of CPU cycles may be specified as a threshold to determine whether sufficient resources are available In further variations, the availability of sufficient resources can be based, for example, on the late of change of CPU cycles, or observations of the user mouse or another user input device (which assumes that additional CPU cycles will be consumed by the live agent following such a user input)

If it is determined during step 440 that resources are not likely to be available, the VXML process 440 stays in a "not-available" mode during step 445, and returns to step 430. If it is determined during step 440 that resources are likely to be available, the VXML process 400 changes its status during step 450 to an "available" mode by asking the IP Softphone process 170 to signal to the automatic call distribution process 300 that the virtual Agent VXML process is available. The VXML process 400 begins a timer during step 455 for 'N' seconds, and waits for a call. If the automatic call distribution process 300 determines that the virtual agent should receive a call from the IVR queue, the call will be routed to IP Softphone software 170, with the destination marked for the extension of the VXML process 400 (such as extension 2 through N in FIG. 1)

The VXML process 400 receives the telephone number of the calling party and the called number for the call with the incoming call, and makes a request to the VXML applications server 110, for example, via an HTTP request. The VXML applications server 110 returns the first page of the IVR application encoded in VXML script to the VXML process 400 on the agent terminal 160 which is received during step 460 for interpretation. The VXML process 400 uses local CPU resources during step 465 to render the page, perform ASR and TTS services, if necessary, and return results to the VXML applications server 110

A test is performed during step 470 to determine if the interaction with the caller is finished. For example, the final VXML page sent from the VXML, applications server 110 to the VXML process 400 can instruct the VXML process 400 to terminate or transfer the call. If it is determined during step 470 that the interaction with the caller is not finished, the VXML process 400 will return to step 465 to process the next IVR script page. If it is determined during step 470 that the interaction with the caller is finished, the VXML process 400 will request the IP Softphone 170 to disconnect or to transfer the call during step 480. As part of standard processing between the automatic call distribution process 300 and the virtual agent, the virtual agent will be put into a "not-available" mode automatically The VXML process will then return to step 430 to monitor system resources It is noted that if the predicted availability of an agent terminal 160 during step 440 turns out to be incorrect, the terminal 160 must merely time share the available CPU cycles between the functions of the live agent and the IVR functions of the automated agent, in a known manner.

It is to be understood that the embodiments and variations shown and described herein are merely illustrative of the principles of this invention and that various modifications may be implemented by those skilled in the art without departing from the scope and spirit of the invention

I claim:

1. A method comprising:
   receiving a telephone call from a caller;
   assigning said telephone call to an IVR queue monitoring an availability status of an automated agent of a call center, wherein:
   i. said automated agent is executing on an agent terminal, and
   ii. said agent terminal is employed by a corresponding human agent; and
   routing said telephone call from said IVR queue to an available automated agent based on CPU utilization of said agent terminal, on which said automated agent is running.

2. The method of claim 1, wherein said availability status is based on a number of predicted available CPU cycles.

3. The method of claim 1, wherein said agent terminal uses local processing resources to perform at least one interactive voice response function.

4. The method of claim 3, wherein said at least one interactive voice response function includes rendering an IVR script.

5. The method of claim 3, wherein said at least one interactive voice response function includes an automatic speech recognition function.

6. The method of claim 3, wherein said at least one interactive voice response function includes a text-to-speech translation function.

7. The method of claim 1, wherein said agent terminal uses local processing resources to provide IP telephony resources to said human agent.

8. An interactive voice response (IVR) system for assigning a telephone call to an automated agent of a call center, said automated agent executing on an agent terminal employed by a corresponding human agent, said IVR system comprising:
   a memory; and
   at least one processor, coupled to the memory, operative to:
   receive a telephone call from a caller;
   assign said telephone call to an IVR queue monitor an availability status of said automated agent, wherein:
   i. said automated agent is executing on an agent terminal, and
   ii. said agent terminal is employed by a corresponding human agent; and
   route said telephone call from said IVR queue to an available automated agent based on CPU utilization of said agent terminal, on which said automated agent is running.

9. The IVR system of claim 8, wherein said availability status is based on a number of predicted available CPU cycles.

10. The IVR system of claim 8, wherein said agent terminal uses local processing resources to perform at least one interactive voice response function.

11. The interactive voice response (IVR) system of claim 10, wherein said at least one interactive voice response function includes rendering an IVR script.

12. The interactive voice response (IVR) system of claim 10, wherein said at least one interactive voice response function includes an automatic speech recognition functions.

* * * * *